(12) United States Patent
Challoner et al.

(10) Patent No.: US 6,360,601 B1
(45) Date of Patent: Mar. 26, 2002

(54) MICROGYROSCOPE WITH CLOSED LOOP OUTPUT

(75) Inventors: A. Dorian Challoner, Manhattan Beach; Roman C. Gutierrez, La Crescenta; Tony K. Tang, Glendale; Donald R. Cargille, Culver City, all of CA (US)

(73) Assignee: Hughes Electronics Corp., El Segundo, CA (US)

( * ) Notice: Subject to any disclaimer, the term of this patent is extended or adjusted under 35 U.S.C. 154(b) by 0 days.

(21) Appl. No.: 09/488,425

(22) Filed: Jan. 20, 2000

(51) Int. Cl.$^7$ .................................................. G01P 9/04
(52) U.S. Cl. .................................................. 73/504.12
(58) Field of Search ........................ 73/504.02, 504.04, 73/504.12, 504.15, 514.17, 514.18, 504.14, 504.16; 702/145, 147

(56) References Cited

U.S. PATENT DOCUMENTS 5,604,309 A * 2/1997 Ward ............................ 73/488
5,983,718 A * 11/1999 Wyse et al. ............... 73/504.12
5,987,986 A * 11/1999 Wyes et al. ............... 73/504.12
6,079,272 A * 6/2000 Stell et al. ................ 73/504.12
6,164,134 A * 12/2000 Cargille .................... 73/504.02

* cited by examiner

Primary Examiner—Helen Kwok
(74) Attorney, Agent, or Firm—Terje Gudmestad

(57) ABSTRACT

A micro-gyroscope (10) having closed loop operation by a control voltage ($V_{TY}$), that is demodulated by an output signal of the sense electrodes (S1, S2), providing Coriolis torque rebalance to prevent displacement of the micro-gyroscope (10) on the output axis (y-axis). The present invention provides wide-band, closed-loop operation for a micro-gyroscope (10) and allows the drive frequency to be closely tuned to a high Q sense axis resonance. A differential sense signal (S1–S2) is compensated and fed back by differentially changing the voltage on the drive electrodes to rebalance Coriolis torque. The feedback signal is demodulated in phase with the drive axis signal ($K_\omega \Theta_x$) to produce a measure of the Coriolis force.

12 Claims, 1 Drawing Sheet

MICROGYROSCOPE WITH CLOSED LOOP OUTPUT

GOVERNMENT INTEREST

The invention described herein was made in the performance of work under a NASA contract, and is subject to the provisions of Public Law 96-517 (35 U.S.C. §202) in which the Contractor has elected to retain title.

TECHNICAL FIELD

The present invention relates to micro-machined electromechanical systems, and more particularly to a MEMS vibratory gyroscope having closed loop output.

BACKGROUND ART

Micro-gyroscopes are used in many applications including, but not limited to, communications, control and navigation systems for both space and land applications. These highly specialized applications need high performance and cost effective micro-gyroscopes.

There is known in the art a micro-machined electromechanical vibratory gyroscope designed for micro-spacecraft applications. The gyroscope is explained and described in a technical paper entitled "Silicon Bulk Micro-machined Vibratory Gyroscope" presented in June, 1996 at the Solid State Sensors and Actuator Workshop in Hilton Head, S.C.

The prior art gyroscope has a resonator having a "cloverleaf" structure consisting of a rim, four silicon leaves, and four soft supports, or cantilevers, made from a single crystal silicon. The four supports provide mechanical support and restoring force for the harmonic motion of the structure. A metal baton is rigidly attached to the center of the resonator, in a plane perpendicular to the plane of the silicon leaves, and to a quartz base plate spaced apart from the silicon leaves. The quartz base plate has a pattern of electrodes that coincides with the cloverleaf pattern of the silicon leaves. The electrodes include two drive electrodes and two sense electrodes.

The micro-gyroscope is electrostatically actuated and the sense electrodes capacitively detect Coriolis induced motions of the silicon leaves. The micro-gyroscope has a low resonant frequency due to the large mass of the metal post and the soft cantilevers. The response of the gyroscope is inversely proportional to the resonant frequency. Therefore, a low resonant frequency increases the responsivity of the device.

The cloverleaves provide large areas for electrostatic driving and capacitance sensing. Applying an AC voltage to capacitors that are associated with the drive electrodes excites the resonator. This excites the rotation $\ominus_x$ about the drive axis and rocking-like displacement $\ominus_y$ for the leaves.

Because the post is rigidly attached to the leaves, the rocking movement of the leaves translates to movement of the baton. When the leaves oscillate in the drive mode, the displacement of the post is near parallel to the leaf surface in the y-direction. When a rotation rate is applied about the z-axis, Coriolis force acts on the oscillating post and causes its displacement in the x-direction. The baton displacement is translated back into the rocking motion, $\ominus$, of the leaves. The baton provides large Coriolis coupling that transfers energy between the two orthogonal rocking modes.

The control electronics associated with the micro-gyroscope include an actuation circuit that is essentially an oscillator around the micro-gyroscope that locks onto the drive resonance mode. The signals from the sense electrodes are summed to remove the differential signal between them and the response of the sense resonance from the feedback loop. On the other hand, the sense circuit subtracts the signals from the sense electrodes to remove the common-mode drive signal.

Micro-gyroscopes are subject to electrical interference that degrades performance with regard to drift and scale factor stability. Micro-gyroscopes often operate the drive and sense signals at the same frequency to allow for simple electronic circuits. However, the use of a common frequency for both functions allows the relatively powerful drive signal to inadvertently electrically couple to the relatively weak sense signal.

Typically, prior art micro-gyroscopes are open loop and untuned. If the drive frequency is tuned closely to a high Q sense axis resonance, large mechanical gain and low sensitivity to sensor noise is possible. High Q also results in low rate drift.

However, close tuning leads to large uncertainty in the gain and phase of the open-loop response. Phase variations lead to added rate drift errors due to quadrature signal pickup and the gain variations lead to rate scale factor errors. Operating the open-loop micro-gyroscope in a closely tuned manner results in higher scale factor error, higher rate errors due to mechanical phase shifts, and slower response with sensitive lightly damped resonances. Additionally, the response time of the open-loop micro-gyroscope is proportional to the damping time constant, Q, of the sense resonance. To reduce rate drift, very long natural damping time constants are required, slowing the response time.

If the drive frequency is tuned closely to a high Q sense axis resonance, a force-to-rebalance method that incorporates complex demodulators and modulators in multiple re-balance loops is necessary. The modulators and demodulators provide coherent feedback only for signals modulating the drive frequency, and therefore do not provide active damping of independent sense resonance vibrations. These vibrations, if not exactly matched to the drive frequency, are not actively damped resulting in false rate signals or noise.

Noise and drift in the electronic circuit limit micro-gyroscope performance. Therefore, prior art micro-gyroscopes perform poorly and are unreliable in sensitive space applications.

SUMMARY OF THE INVENTION

The present invention is a cloverleaf micro-gyroscope having closed loop operation. The differential sense signal (S1–S2) is compensated by a linear electronic filter and directly fed back by differentially changing the voltages on the two drive electrodes (D1–D2) to rebalance Coriolis torque, suppress quadrature motion and increase the damping of the sense axis resonance. The resulting feedback signal is demodulated in phase with the drive axis signal (S1+S2) to produce a measure of the Coriolis force and, hence, the inertial rate input.

The micro-gyroscope of the present invention has a larger sensor bandwidth and is insensitive to tuning errors between drive and sense axis vibration frequency, thereby enabling low-noise tuned operation. The Coriolis force re-balance method of the present invention reduces the complexity of the control circuit and increases the robustness. No modulators or demodulators are necessary in the Coriolis force re-balance loop of the present invention. The presence of external disturbances or tuning errors increases the performance of the micro-gyroscope of the present invention because it provides active damping of the sense axis resonance.

Additionally, rate drift errors (caused by quadrature signal pickup) and rate scale factor errors (caused by gain variations) are reduced in the present invention by the feedback loop gain. Fast response time is possible with lightly damped resonances because the response time in the closed-loop micro-gyroscope of the present invention is proportional to feedback gain and not the natural damping of the resonance.

It is an object of the present invention to reduce the complexity and improve the performance of vibratory micro-gyroscopes. It is another object of the present invention to increase the bandwidth and decrease sensitivity to tuning errors associated with vibratory micro-gyroscopes.

It is a further object of the present invention to provide closed-loop operation of a vibratory micro-gyroscope. It is still a further object of the present invention to compensate the differential sense signal and provide a feedback loop by differentially changing the voltages on the drive electrodes. It is yet a further object of the present invention to demodulate the feedback signal in-phase with the drive axis signal to provide a method of Coriolis force re-balance for a micro-gyroscope.

Other objects and features of the present invention will become apparent when viewed in light of the detailed description of the preferred embodiment when taken in conjunction with the attached drawings and appended claims.

BEST MODE(S) FOR CARRYING OUT THE INVENTION

Figure 1:
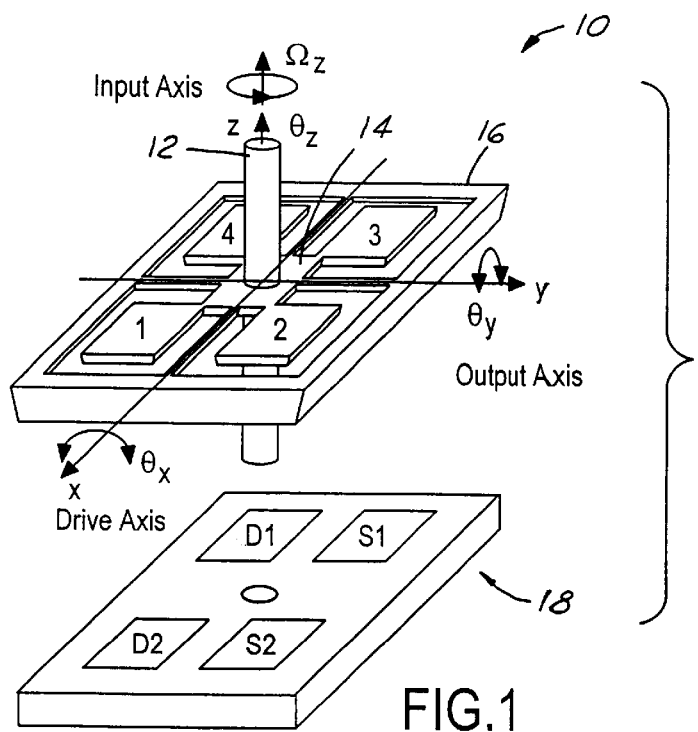
FIG. 1 is an exploded view of a vibratory micro-gyroscope.

FIG. 1 is an exploded view of the micro-gyroscope 10, the operation of which was described in detail above and is summarized hereinafter. The cloverleaf micro-gyroscope 10 has a baton 12 attached to a resonator plate 14 having a cloverleaf shape with petals labeled 1, 2, 3, and 4. The cloverleaf resonator plate 14 is elastically suspended from an outer frame 16.

A set of four electrodes 18, located under the resonator plate 14, actuate the resonator plate and sense capacitance on the resonator plate 14. Drive electrodes D1 and D2 actuate movement of the resonator plate 14 and sense electrodes S1 and S2 sense capacitance. A set of axes are labeled x, y and z to describe the operation of the micro-gyroscope.

Rocking the baton 12 about the x-axis actuates the micro-gyroscope 10. The rocking motion is accomplished by applying electrostatic forces to petals 1 and 4 by way of a voltage applied to the drive electrodes, D1 and D2. For a steady inertial rate, $\Omega$, along the z-axis or input axis, there will be a displacement about the y-axis, or output axis, that can be sensed by the differential output of the sensing electrodes, S1–S2 or $V_{Thy}$. The displacement about the y-axis is due to the influence of a rotation induced Coriolis force that needs to be restrained by a counteracting force.

Figure 2:
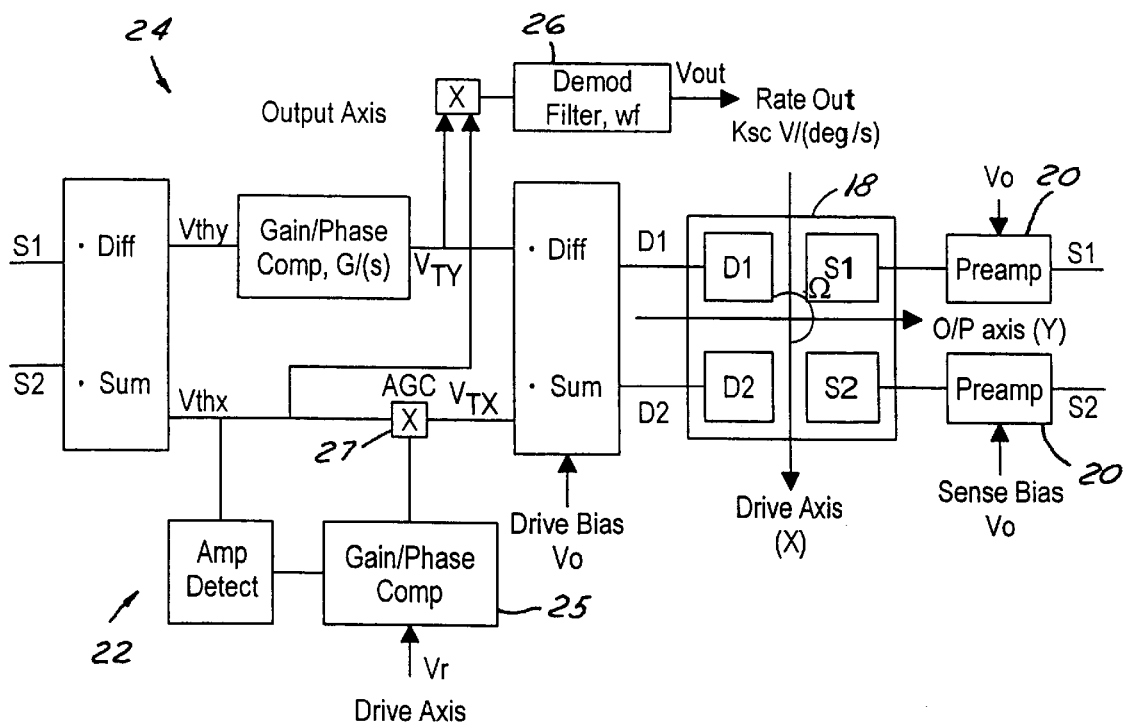
FIG. 2 is a block diagram of the closed-loop micro-gyroscope of the present invention.

Referring now to FIG. 2, the wide-band closed-loop operation of the present invention will be described. The present invention provides a closed-loop control circuit that nulls displacement about the y-axis through linearized electrostatic torques that are proportional to control voltages. The two drive electrodes D1 and D2 produce linearized electrostatic torques about the x and y axes that are proportional to control voltages $V_{Tx}$ and $V_{Ty}$. D1 and D2 are defined as:

$$D1 = V_o - V_{Ty} + V_{Tx} \quad (1)$$

and $$D2 = V_o + V_{Ty} + V_{Tx} \quad (2)$$

where $V_o$ is a bias voltage.

The linearized torques are defined as:

$$T_x = K_T V_{Tx} \quad (3)$$

$$T_y = K_T V_{Ty} \quad (4)$$

where the torque constant is:

$$K_T = [2r_o C_o V_o][d_o]^{-1}. \quad (5)$$

≡ ≡ $r_o$=offset from x or y axis to control, or drive, electrode center, $C_o$ is the capacitance of one control electrode, $V_o$ is the bias voltage, and $d_o$ is electrode gap which is the nominal separation between the electrode plane and the resonator plane.

The control voltage $V_{Tx}$ provides for automatic gain control of the drive amplitude. The control voltage $V_{Ty}$ provides for Coriolis torque re-balance. The output axis (y-axis) gain and phase compensation are selected based on computed or measured transfer functions, G(s), from $V_{Ty}$ to $V_{thy}$. The reference signal used to demodulate $V_{Ty}$ is $V_{thx}$ which is in phase with the drive axis signal, $\Theta_x$.

Referring still to FIG. 2, the closed loop operation of the micro-gyroscope of the present invention measures the inertial rate, $\Omega$, around the z-axis. Signals S1 and S2 are output from pre-amplifiers amplifiers 20 that are attached to the sense electrodes S1 and S2.

The micro-gyroscope is set in motion by a drive loop 22 that causes the baton to oscillate around the x-axis. The baton rocks and has a rate of rotation about the x-axis. D1 and D2 apply voltages in phase therefore, they push and pull the resonator plate creating a torque, $T_x$, on the x-axis.

S1 and S2 are in phase and indicate a rotation around the x-axis. S1 and S2 are amplitude and gain phase compensated in a direct feedback loop 22 to drive $V_{thx}$ to $V_{Tx}$.

When there is no inertial rate on the z-axis, there is no differential motion on S1 and S2. In this case, $V_{Thy}$=0. When an inertial rate is applied, it creates a difference between S1 and S2. In the prior art $V_{Thy}$ was merely sensed as being proportional to the rate of the micro-gyroscope. In the present invention $V_{Thy}$ is gain and phase compensated based on a computed, or measured, transfer function G(s). The output from the preamplifiers 20 is fed to a gain and phase compensation circuit 25. A reference signal, $V_r$, is applied to cancel the effects of damping. Automatic gain control loop 27 regulates the amplitude of the vibration drive.

To obtain the rotation rate signal, $\Omega$, the outputs from S1 and S2 are processed through a demodulator and filter circuit 26. The DC component of the output signal of the demodulator is proportional to the rotation rate $\Omega$.

In the present invention, as the drive axis creates a disturbance on the y-axis, it is measured using a demodulation scheme for the output. The present invention prevents rocking on the y-axis by feedback 24 applied by differentially feeding D1 and D2. In the present invention D1 and D2 are responsive to $V_{Ty}$ as well as $V_{Tx}$.

$V_{thx}$ and $V_{thy}$ are defined by:

$$V_{thx} = S1 + S2$$

$V_{thy} = S1 - S2$

Both $V_{thx}$ and $V_{thy}$ are directly proportional to the drive rate $K_\omega \Theta_x$ where $K_{107}$ is defined by:

$$K_{107} = [2r_o C_o V_o R][d_o]^{-1}$$

and R is the transimpedance from the preamplifiers 20.

It should be noted that while the present invention is being described in a preferred embodiment, it is possible to modify the present invention without departing from the scope of the appended claims. For example, a bandpass filter, or notch filter, may also be applied to $V_{thy}$ to reject second harmonics prior to application of the feedback gain. Also, if the cloverleaves of the resonator plate are well grounded, capacitive drive feedthrough is reduced and stability margins are improved. Accordingly, it is intended that the invention be limited only in terms of the appended claims.

What is claimed is:

1. A Coriolis gyroscope comprising:
   a resonator having an output axis and output signals therefrom;
   a large parallel plate capacitor mounted to said resonator for sensing motion of said output axis;
   a feedback controller having a composite gain and phase response over a finite frequency band such that an active damping of said output axis resonance and rebalance of a Coriolis force signal are provided; and
   a demodulator located outside of said feedback controller, said demodulator being responsive to a feedback signal from said output axis and a drive frequency signal to produce an output proportional to said Coriolis force.

2. The gyroscope as claimed in claim 1 wherein said finite frequency band further comprises an output axis resonance frequency and a Coriolis sensor response.

3. The gyroscope as claimed in claim 1 wherein said feedback controller applies linearized torques to said resonator and said parallel plate capacitor to null a displacement of said resonator and said parallel plate capacitor.

4. The gyroscope as claimed in claim 3 wherein said linearized torques are proportional to a control voltage $V_{Tx}$ derived from processing a sum of the output signals of the output axis and $V_{Ty}$ derived from processing a difference of the output signals of the output axis.

5. The gyroscope as claimed in claim 4 wherein said control voltages $V_{Tx}$ has automatic gain control.

6. The gyroscope as claimed in claim 4 wherein said control voltages $V_{Tx}$ and $V_{Ty}$ are demodulated by reference signals $V_{thx}$, $V_{thy}$.

7. The gyroscope as claimed in claim 6 wherein said reference signal $V_{thx}$ is defined as the sum of the output signals of said output axis and said reference signal $V_{thy}$ is defined as the difference of the output signals of said output axis.

8. The gyroscope as claimed in claim 6 wherein a bandpass filter is applied to said reference signal $V_{thy}$.

9. The gyroscope as claimed in claim 6 wherein a notch filter is applied to said reference voltage $V_{thy}$.

10. The gyroscope as claimed in claim 6 wherein said reference signals $V_{thx}$ and $V_{thy}$ are gain and phase compensated.

11. The gyroscope as claimed in claim 10 wherein said reference signal $V_{thx}$ is used to demodulate a rate output sensed by said gyroscope, said rate output is proportional to an inertial rate of said resonator.

12. The gyroscope as claimed in claim 11 wherein said rate output is demodulated by said control voltage $V_{Ty}$.

* * * * *